May 15, 1945.  D. H. NELSON ET AL  2,375,811
SIGNAL INTERRUPTER
Original Filed Feb. 16, 1938
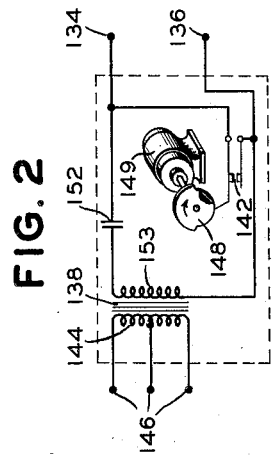
FIG. 2
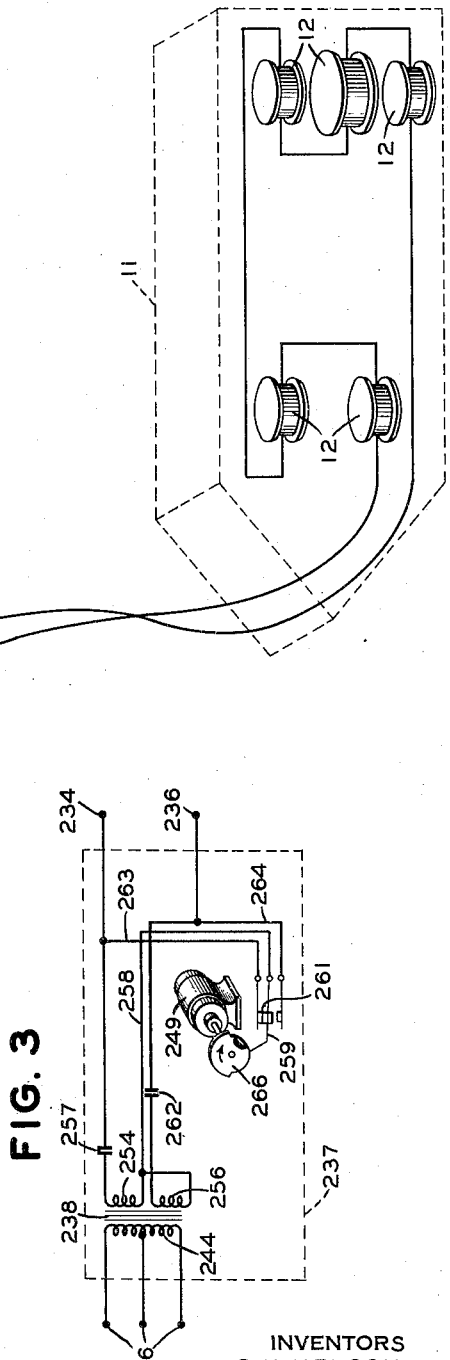
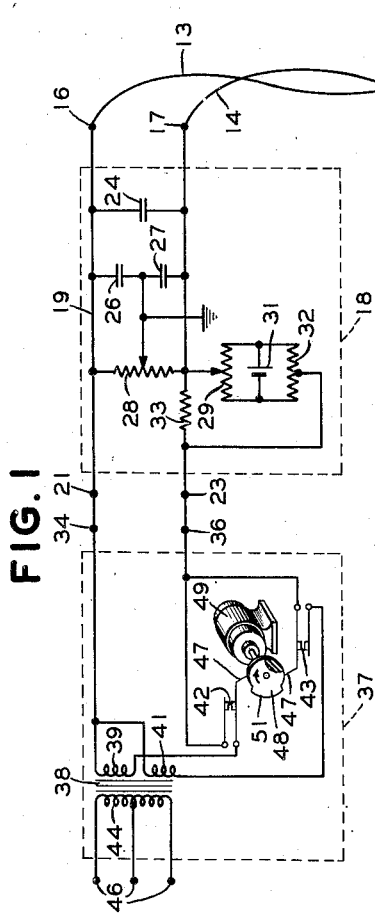
FIG. 1
FIG. 3
INVENTORS
D. H. NELSON
W. D. BUCKINGHAM
BY
*M. R. Marsh*
ATTORNEY Patented May 15, 1945

2,375,811

UNITED STATES PATENT OFFICE 2,375,811

SIGNAL INTERRUPTER

Dale H. Nelson, Water Mill, and William D. Buckingham, Southampton, N. Y., assignors to The Western Union Telegraph Company, New York, N. Y., a corporation of New York Original application February 16, 1938, Serial No. 192,770, now Patent No. 2,238,072, dated April 15, 1941. Divided and this application April 10, 1941, Serial No. 387,840

7 Claims. (Cl. 171—119)

This invention relates primarily to a signal interrupter arrangement and more particularly to an interrupter arrangement for use in connection with the amplification of extremely small and slowly varying electrical potentials.

The present application is a division of an application bearing Serial No. 192,770, filed February 16, 1938, which has issued as Patent No. 2,238,072, dated April 15, 1941, entitled "Method of and means for locating concealed bodies." The above mentioned application discloses a method with the apparatus and arrangement thereof as used in determining the depth to which concealed bodies, such as submarine cables, are buried beneath the bed of a body of water. In practising the above invention a sled containing a detecting means is dragged along the bed of the body of water, and the passage thereof over a buried object such as a submarine cable generates electrical signals from which may be determined the depth of the concealed body below the bed of the body of water. The detecting means in the sled comprises a set of coils which are so arranged and constructed as to generate no appreciable signal on movement of the sled through undisturbed portions of the earth's magnetic field, whereas the movement of the sled over a concealed body such as an ocean cable which disturbs, distorts or affects the earth's magnetic field causes the generation of signals in the detecting means. The generated signals are conveyed to an observation point which, in the case of using the detecting means to determine the depth of a submarine cable below the bed of a body of water, would be on board the ship towing the sled. As the signals are received on board the ship, they encounter various units including a balancing circuit, an interrupter, about which the present invention is concerned, an amplifier, and a recording unit.

The signals generated in the detecting means and transmitted to the apparatus aboard the ship are at an extremely low level. The maximum signal obtainable from the detecting means normally employed is in the neighborhood of $.3 \times 10^{-6}$ amperes through an amplifier input resistance of 50 ohms, or $15 \times 10^{-6}$ volts. Essentially the signal generated is an alternating current signal of very low frequency, the frequency being in the neighborhood of one-half to one cycle per second. With such low frequencies ordinary transformer coupled amplifiers are impractical, and accordingly the signal is treated as a direct current signal of slowly changing polarity. In determining the depth to which the submarine cable is buried in the bed of the body of water, quantitative measurements of the signals are made, and in order to obtain accurate results careful treatment of the signals is necessary.

In connection with the amplification of the generated signals an interrupter is employed, and it is one of the primary objects of the invention to provide an interrupter arrangement which will meet the demands placed thereon by the requirements of the nature of the signals.

Another object of the invention is to provide an interrupter arrangement wherein any contact potential produced at the interrupting point or points has little or no effect on the signals interrupted.

Other objects of the invention will be apparent from the following description, when taken in conjunction with the accompanying drawing, in the latter of which:

Fig. 1 shows the preferred form of the interrupter and the associated equipment including the balancing circuit and the signal generating or detecting means located in the sled;

Fig. 2 is a first modification of the interrupter circuit; and

Fig. 3 is a second modification of the interrupter circuit.

Referring first to Fig. 1, the detecting means or sled is represented at 11 and is adapted to be dragged along the bed of the body of water in which the body such as a submarine cable is buried. The sled 11 contains coils such as 12 predeterminedly arranged so that movement of the sled through an undisturbed portion of the earth's magnetic field generates no appreciable signal, whereas movement of the sled through a disturbed portion of the earth's field generates a signal. The coils 12 may be arranged in any one of a plurality of arrangements, as disclosed in the above mentioned parent application, and other things being equal, the strength of the signal generated in the sled in passing over a submarine cable is dependent upon or is a function of the distance the submarine cable is buried below the bed of the body of water.

As fully described in the above mentioned application, the signal generating means in the sled or the coils 12 are preferably arranged in at least two sets separated by a reasonable distance so that the passage of the sled over a buried cable generates at least two signal impulses. By making the geometries and disposition of the coils of each set different, each signal generated by a set is different, and the ratio of the signals generated by each set is used to determine the depth below the bed of the body of water that the concealed body or cable is buried. By using the ratio method, the speed of movement of the sled relative to the concealed body, the degree of magnetization or the disturbance of the earth's field by the concealed body, and various other factors more or less difficult to evaluate may be disregarded as such factors which tend to vary the strength of the signals generated need not be evaluated when the ratio method is employed.

The sled 11 is connected to the apparatus on board ship by two conductors 13 and 14, and in the preferred embodiment the conductors 13 and 14 are combined with or are formed integral with the towing means for the sled 11. The two wires 13 and 14 terminate at points 16 and 17, respectively, on the input side of a balancing circuit enclosed within the dot-dashed rectangle 18. The purpose of the balancing circuit is to balance out the direct current flowing in the circuit arising from thermoelectric, contact potential and galvanic phenomena by introducing a small direct current potential of correct polarity and magnitude. One end of a conductor 19 terminates at the point 16 and the other end at a point 21 on the opposite or output side of the balancing circuit. Similarly, a conductor 22 connects the input point 17 through a balancing circuit to an output point 23. In the balancing circuit a condenser 24 is connected across the conductors 19 and 22 and acts as a reservoir during the time, as will hereinafter be described, interrupter contacts are open. Two filter condensers 26 and 27 are also connected from the conductors 19 and 22 to ground and serve as by-passes for various forms of interference. In addition, a potentiometer 28 connected across the conductors 19 and 22 allows a ground to be placed on the circuit at the most advantageous position for minimum noise. A second potentiometer 29 in the neighborhood of 50,000 ohms in conjunction with a small battery 31 and a comparatively large resistance 32 is connected around a comparatively small resistance 33 in the conductor 22. The potentiometer 29 and battery 31 with the associated resistances provide a means for applying and varying a balancing direct current to the circuit. Such an arrangement eliminates the effect of any contact potential of the potentiometer 29 in the signal circuit which might be of substantial magnitude when compared with the extremely low level signals picked up or generated in the sled 11.

The output points 21 and 23 of the balancing circuit are connected to points 34 and 36, respectively, on the input side of an interrupter and input transformer circuit represented within the dot-dashed rectangle 37. The purpose of the interrupter is to interrupt the generated signals at a desired constant frequency and feed the same to the primary of an input transformer 38. In the preferred embodiment the input transformer 38 has two primary windings 39 and 41, one associated with each of a set of two interrupter contacts 42 and 43, respectively. The upper one of the primary 39 is serially connected with the contacts 42 to the points 34 and 36, while the lower one of the primaries 41 is serially connected with contacts 43 to the points 34 and 36. Thus, as shown in Fig. 1, the primary 39 and associated contacts 42 are in parallel relation with the winding 41 and contacts 43. The secondary 44 of the transformer 38 is connected to points 46 to which are connected the amplifier and recording unit as described in the above mentioned parent application.

The contact sets 42 and 43 are of the type which comprises movable elements or tongues 47 which normally tend to move to a position to open the contacts. Associated with the tongues 47 of the contacts 42 and 43 is a cam 48 adapted to be rotated by means such as an electric motor 49 having the desired speed characteristics. The cam 48 is of insulating material and has a section 51 of increased radius adapted to alternately engage the tongues 47 of the contacts 42 and 43 to close the same at the desired times. Obviously, various other means of closing circuits in place of the cam operated contacts 42 and 43 may be employed, such as a commutator arrangement or relay means, the above cam arrangement being only one of several arrangements adaptable. The section 51 of increased radius of the cam 48 is arranged so that it operates the tongues 47 to alternately close the contacts 42 and 43 and maintain the same in a closed condition during less than one-half of a revolution of the cam.

Starting with both contacts 42 and 43 in an open condition, as shown, the sequence of operation is as follows, assuming a positive potential to have appeared at the point 34 and a negative potential at the point 36. The cam 48 operates the tongue 47 of contacts 42 to close the same, which allows current to pass through the primary winding 39. The high part 51 of the cam 48 maintains the contacts 42 closed for less than one-half of its revolution and in rotating out of operative relation therewith permits the said contacts to open with a resultant drop in the current flowing through the primary winding 39. This abrupt drop of current in the primary winding 39 induces a sharp peaked secondary voltage in the secondary winding 44 of the transformer 38, as at this time both primaries 39 and 41 are open. Following less than one-quarter of a revolution of the cam 48 after the opening of the contacts 42, the high part of the cam closes the contacts 43. This establishes a circuit through the lower primary winding 41, and as the establishment of this current is relatively slow, very little secondary voltage is induced in the secondary winding 44. The high part 51 rotating out of operative relation with the tongue of the contacts 43 permits these contacts to open to break the current in the associated primary winding to induce another sharp peaked secondary voltage in the secondary winding 44. The sharp peaked secondary voltages induced in the secondary winding 44 are employed to operate the amplifier which, in turn, controls the recording unit.

In the modification shown in Fig. 2 of the interrupter circuit, which is enclosed within the dot-dashed rectangle, only a single set of contacts 142 are employed. The contacts 142 are periodically closed by means such as a cam 148 operating from a motor 149. The points 134 and 136 in Fig. 2 are the input points of the interrupter circuit, while the points 146 are the output. The point 134 is connected through a condenser 152 in series with the primary winding 153 of the transformer 138 to the point 136. The contacts 142 are connected across the points 136 and 134 as shown. The operation of the modification shown in Fig. 2, assuming positive potential to have appeared at the point 134 and negative potential at the point 136 with the contacts 142 open, is as follows. The positive current will charge the condenser 152 and flow in a downward direction through the primary winding 153 of the transformer 138. This will be accompanied by a voltage in the secondary winding 144 of the transformer which will be greatest at the time the current is changing most rapidly in the primary winding. Following the charging of the condenser 152, the value thereof being properly chosen in conjunction with the speed of rotation of the cam 148, the said cam closes the contacts 142 and allows the positive charge on the condenser 152 to dissipate in an upward direction through the primary winding 153. The discharging of the condenser 152 will induce a sharp peaked secondary voltage in the secondary winding 144, as the discharge path of the condenser is of very low resistance. As the resistance of the entire circuit including the detecting means in the sled 11 is considerable, the build-up of the charge on the condenser 152 is at a much slower rate than the discharge thereof, and hence the induced voltage in the secondary winding 144 of the transformer 138 is very much less during the charging of the condenser than during the discharging thereof. Accordingly, the predominating frequency of the voltage generated in the secondary winding 144 is the frequency at which the contacts 142 are operated, i. e., the complete cycle of opening and closing the contacts 142 causes one complete alternation of the voltage in the secondary winding 144.

In the second modification which, as shown in Fig. 3, is enclosed within the rectangle 237, the transformer 238 has two primary windings 254 and 256. The upper terminal of the primary winding 254 is connected through a condenser 257 to the input terminal 234 and the lower terminal of this winding is connected by a conductor 258 to the movable tongue 259 of a contact set 261. The lower terminal of the lower winding 256 is also connected to the conductor 258 and the tongue 259, while the upper terminal of this lower primary winding 256 is connected through a condenser 262 to the input terminal 236. The upper and lower stops of the contact set 261 are connected as shown by conductors 263 and 264, respectively, to the input terminals 234 and 236. The terminals 246 connected to the secondary winding 244 of the transformer 238 constitute the output terminals of the interrupter circuit of Fig. 3.

The tongue 259 of the contact set 261 is operated by a rotatable cam member 266 which is driven from a motor 249 to cause the tongue to engage first one of its associated stops and then the other. In the embodiment shown in Fig. 3, the cam 266 is so arranged that it operates the tongue 259 to alternately engage its associated stops, the tongue remaining in contact with each stop for approximately a half of a revolution of the cam. The travel time of the tongue 259 relative to the length of a cycle of the cam is so short as to be negligible.

Assuming positive potential to have appeared at the point 234 and negative potential at the point 236, and the tongue 259 in contact with its upper stop, the operation of the embodiment shown in Fig. 3 is as follows. The positive potential will flow through the upper stop and tongue of the contact set 261 and in an upward direction through the lower primary winding 256 to the limit of the capacity of condenser 262 to the point 236. Simultaneously, the condenser 257 which carried a charge from the previous part of the cycle (negative on the transformer side) will discharge through the primary winding 254 with positive current flowing in an upward direction therethrough. These two currents in the primaries 254 and 256 occur substantially at the same time and assist one another in inducing a secondary voltage in the secondary winding 244. This voltage is obviously greatest at approximately the instant the combined current in the primary windings is changing most rapidly.

The second part of the operation occurs when the tongue 259 makes contact with its lower stop. At this time the charge on the condenser 262 will be allowed to dissipate through the primary winding 256 with positive current flowing in a downward direction simultaneously with the charging of the condenser 257. This charging of the condenser 257 is such that positive current flows in a downward direction through the primary 254, which current assists that in the primary 256 in inducing a relatively sharp peaked secondary voltage in the secondary winding 244. This second induced voltage is in an opposite direction to that established during the interval the tongue 259 was in contact with its upper stop, and accordingly the predominating frequency of the voltage generated in the secondary is the frequency at which the tongue makes one complete vibration.

One of the advantages of the modification shown in Fig. 3 is that any contact potential created at the tongue 259 has little or no effect in inducing a voltage in the secondary winding 244 for reasons which will now be described. Let it be assumed that a contact potential exists between the tongue 259 and the associated upper stop, and that the terminals 234 and 236 are connected to a resistance and/or inductance, as is the case when they are connected to the pick-up coils in the sled and that no voltage is being generated by this resistance and/or inductance. While the tongue 259 contacts the upper stop, the contact potential existing therebetween will be effective to charge the condenser 257 and when the tongue subsequently contacts its lower associated stop, this charge will tend to dissipate through the resistance and/or inductance connected to the points 234 and 236. However, since this resistance and/or inductance is comparatively high, very little of the charge is drawn from the condenser or is drawn at such a slow rate that very little voltage is induced in the secondary winding 244 of the transformer. The tongue 259, contacting its upper stop on the next cycle, allows the contact potential existing at the contacts to again bring the condenser 257 up to its maximum charge. During this time very little current will flow through the associated primary winding, as the condenser 257 was not completely discharged during the time the tongue was in contact with its other stop. In the same manner any contact potential existing between the tongue 259 and the lower stop is effective to charge the condenser 262, which charge slowly or only partly dissipates through the primary winding associated therewith when the tongue is in contact with its upper stop. However, any potential set up between the terminal points 234 and 236 by the detecting means alternately charges the condensers 257 and 262 which are short-circuited and allowed to completely discharge through the very low resistance path to cause large induced voltages in the secondary winding 244. With such an arrangement a contact potential of the order of several volts may exist between the tongue 259 and its associated contacts and be effective to generate no appreciable voltage in the secondary winding after the tongue has passed through several cycles, whereas the application of a voltage of the order of $10^{-5}$ volts at the terminals 234 and 236 will be effective to generate an appreciable voltage in the secondary winding.

In substantially the same manner any contact potential existing between the elements of the contacts 142, Fig. 2, is effective to charge the condenser 152, and this charge or only part thereof is slowly drained off or dissipated through the high resistance circuit during the interval the contacts are open. However, any charges in the condenser 152 due to potential existing between the points 134 and 136 are quickly discharged through a low resistance circuit including the primary winding 153 to induce an appreciable secondary voltage in the secondary winding 144.

It is obvious, of course, that various other modifications of the invention and other applications thereof besides those disclosed herein may be made without departing from the spirit or essential attributes thereof, and it is desired, therefore, that only such limitations be placed thereon as are imposed by the prior art or are specifically set forth in the appended claims.

What is claimed is:

1. In an apparatus for interrupting small and slowly varying electrical potentials, an input circuit comprising a source of variable potential, an amplifying means including a transformer having primary and secondary windings, the primary winding of said transformer being connected to said input circuit, a condenser serially connected with said primary winding and said input circuit, a set of complementary contacts connected to said input circuit in parallel relation thereto relative to said condenser and said primary winding, means for operating said set of complementary contacts to cyclically open and close the same, means operative on the opening of said contacts to charge said condenser by current from said source of potential through said primary winding in one direction, and means operative on the closing of said contacts to short-circuit said condenser to discharge the same solely through said primary winding in opposite direction to the flow of the charging current of said condenser.

2. In an apparatus for amplifying small and slowly varying electrical potentials, an amplifying means including a transformer having primary and secondary windings, an input circuit comprising a source of variable potential, a condenser, said input circuit, said primary winding of said transformer and said condenser being serially connected, said input circuit being of relatively high resistance relative to the resistance of said primary winding, a set of cyclically operable complementary contacts connected to said input circuit in parallel relation thereto relative to said condenser and said primary winding, means operative during the opening of said contacts to charge said condenser through said primary winding in one direction and on the closing thereof to discharge said condenser through said primary winding in the opposite direction, and means including said condenser, the relative high resistance of said input circuit and the relative low resistance of said primary winding to render substantially ineffective on said amplifying means contact potential generated at said contacts.

3. In an apparatus for amplifying small and slowly varying electrical potentials, an amplifying means including a transformer having primary and secondary windings, an input circuit comprising a source of variable potential, a condenser, said input circuit, said primary winding of said transformer and said condenser being serially connected, said input circuit being of relative high resistance relative to the resistance of said primary winding, a set of cyclically operable complementary contacts connected to said input circuit in parallel relation thereto relative to said condenser and said primary winding, means operative during the opening of said contacts to charge said condenser through said primary winding in one direction and on the closing thereof to discharge said condenser through said primary winding in the opposite direction, and means for operating said contacts at such a rate relative to the capacity of said condenser that contact potential generated during the closing of said contacts charges said condenser which charge only partially discharges through said high resistance input circuit during the opening of said contacts whereby said contact potential has substantially no effect on said amplifying means.

4. In an apparatus for amplifying small and slowly varying electrical potentials, a transformer having a divided primary winding and a secondary winding, an input circuit including a source of electrical potential which is to be amplified, a contact device having fixed contacts engaged alternatively by a movable contact, a connection from said movable contact directly to a terminal of each of said primary windings, a pair of condensers, a connection from each terminal of said input circuit to the other terminals of each of said primary windings, each of said connections including one of said condensers in series circuit therewith, a connection from said fixed contacts to the terminals of said input circuit and means for operating said movable contact to alternately engage said fixed contacts to alternately charge said condensers from said source and discharge the same through said primary windings of said transformer.

5. In an apparatus for amplifying small and slowly varying electrical potentials, a transformer having a divided primary winding and a secondary winding, an input circuit including a source of electrical potential which is to be amplified, a contact device having fixed contacts engaged alternatively by a movable contact, a connection from said movable contact to a terminal of each of said primary windings, a connection from each terminal of said input circuit to the other terminals of each of said primary windings including a condenser in circuit therewith, a connection from said fixed contacts to the terminals of said input circuit, means for operating said movable contact to alternately engage said fixed contacts to alternately charge said condensers from said source and discharge the same through said primary windings of said transformer, and means including the high resistance and/or inductance of said input circuit, the low resistance of said primary winding and said condensers for avoiding substantially all effect on said secondary winding of said transformer contact potential generated at said contact device.

6. In an apparatus for amplifying small and slowly varying electrical potentials, a transformer having a divided primary winding and a secondary winding, an input circuit including a source of electrical potential which is to be amplified, a contact device having fixed contacts engaged alternatively by a movable contact, a connection from said movable contact directly to a terminal of each of said primary windings, a pair of condensers, a connection from each terminal of said input circuit to the other terminals of each of said primary windings, each of said connections including one of said condensers in series circuit therewith, a connection from said fixed contacts to the terminals of said input circuit, means for operating said movable contact to alternately engage said fixed contacts to alternately charge said condensers from said source and discharge the same through said primary windings of said transformer, and means including said contact device and said condensers for charging said condensers from said source with the charges flowing through said primaries in one direction and discharging said condensers with the discharge flowing through said primaries in an opposite direction, the discharge of one condenser occurring during the charging of the other and in such directions as to assist in the establishment of potential in said secondary winding.

7. In an apparatus for amplifying small and slowly varying electrical potentials, an input circuit comprising a source of slowly varying potential, contact making and breaking means adapted to operate at a high rate relative to the rate of potential varying at said source, condenser means, amplifier means, means interconnecting said source of potential, said amplifier means, said condenser means and said contact making and breaking means, means including said contact making and breaking means to charge said condenser means from said source of potential through said amplifier means and thereafter discharge said condenser means solely through said amplifier means, said contact making and breaking means operating said contacts at such a rate relative to the resistance and inductance of said input circuit, the resistance of said amplifier means and the capacity of said condenser means for avoiding substantially all effect on said amplifier means of contact potential generated at said contact means.

DALE H. NELSON.
WILLIAM D. BUCKINGHAM.